M. PASCHEN.
APPARATUS FOR LEACHING SACCHARIFEROUS VEGETABLES.
APPLICATION FILED OCT. 15, 1912.
1,077,296.
Patented Nov. 4, 1913.
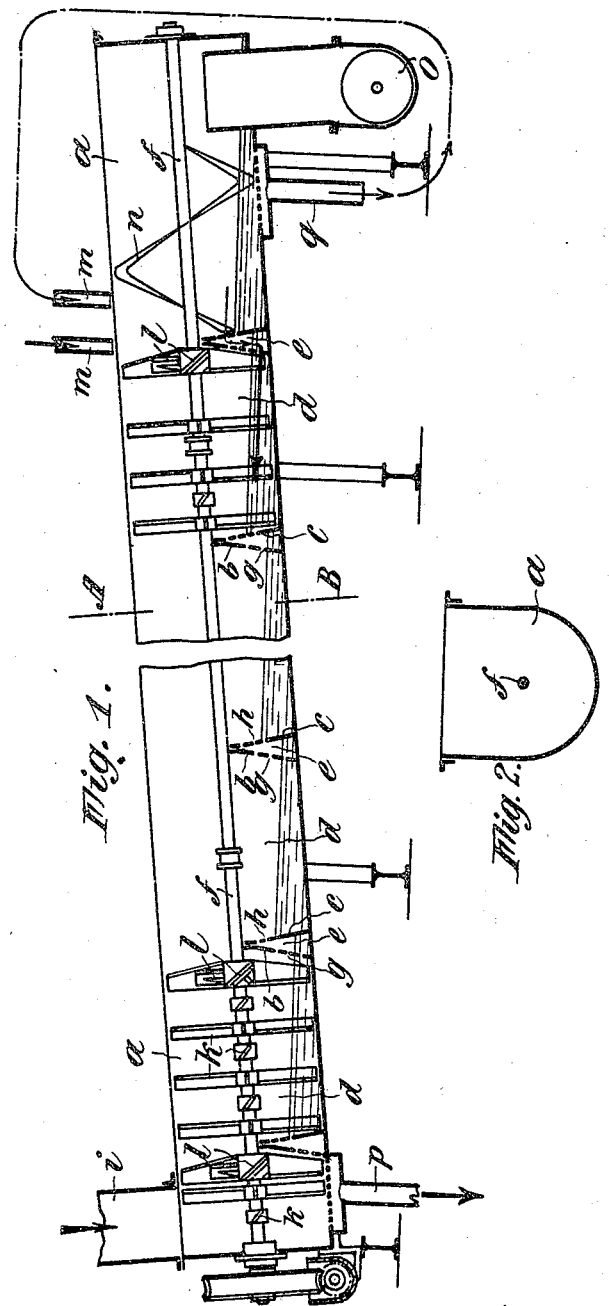
WITNESSES:
John C. Sanders
A. F. Houman
INVENTOR:
BY Max Paschen
Wm Wallace White
ATTY.

UNITED STATES PATENT OFFICE.

MAX PASCHEN, OF KÖTHEN, GERMANY.

APPARATUS FOR LEACHING SACCHARIFEROUS VEGETABLES.

1,077,296.        Specification of Letters Patent.        Patented Nov. 4, 1913.

Application filed October 15, 1912. Serial No. 725,790.

*To all whom it may concern:*

Be it known that I, MAX PASCHEN, a subject of the German Emperor, residing at 18 Schillerstrasse, Köthen, Anhalt, in the German Empire, have invented certain new and useful Improvements in Apparatus for Leaching Sacchariferous Vegetables, of which the following is a specification.

The present invention has for its object a chamber apparatus for leaching sacchariferous vegetable slices. This apparatus consists in the known manner of an inclined trough in which the juice flows from the upper to the lower end in the opposite direction to the slices which are carried upward by agitator and conveyer mechanism, the slices being transferred by discharge devices from each chamber to the next higher chamber over the partitions dividing the several chambers which partitions leave a portion of the cross section of the trough free. Experience has shown that it is impossible with apparatus of this kind to effect a sufficiently uniform leaching of the slices; in particular if the specific weight of the juices and of the slices is essentially different in many cases only a stratified leaching of the slices takes place. Furthermore if the leaching chambers of such apparatus are separated by partitions consisting of a single wall over which the slices fall in the one direction and in the liquid in the other direction, such opposite vertical streams interfere with each other, so that no sufficient leaching effect can be obtained. This defect cannot be obviated by arranging simply for the liquid holes or passages in the foot of the partitions, because in this case the liquid would flow too rapidly through the apparatus from the top to the bottom of the trough without giving a sufficient leaching effect.

In accordance with the invention all these defects are obviated by arranging separate overfalls for the slices and the liquid. The liquid is dammed up in each chamber by the overfall, so that it can have a sufficient leaching effect.

The separate overfalls in the simplest modification of the invention are formed by chambers situated in the hollow partitions, which chambers have inlet openings for the liquid of the higher chamber at the upper end of their one wall and outlet openings to the lower chamber at the lower end of their other wall.

By the invention it is first made possible to leach sufficiently slices in counter-current. Practical experience has shown that the new apparatus using only counter-current can be more than 3 times shorter than the older apparatus using a mixed system of parallel and counter-current. Correspondingly the time of leaching is shortened and in the same proportion the purity of the juices. Also by the new apparatus a great amount of heat is saved in the leaching process, because the liquid and the slices in the counter-current wholly exchange their temperatures, so that hot juices and cold slices can be obtained which is deemed to be a very great advantage. Further in the new apparatus pumps are avoided which in the older apparatus bring the liquid from one leaching chamber to the other.

In the new apparatus the juice is caused to flow through the several chambers not merely in the direction of their length but also to flow through the slices obliquely upward in the diagonal direction of the mass of slices located in the chamber. With this object the several leaching chambers are separated by inversion chambers which the juice is able to enter but not the slices. These chambers are termed "inversion chambers" because the juice enters them at their upper end and issues again below so that the chambers serve to convey the juice from the upper end of one leaching chamber back to the lower end of the next chamber. Owing to this arrangement the path of the juice through the masses of slices is considerably lengthened whereby the leaching is improved. A further improvement in this connection is insured owing to the fact that in view of the inversion chambers, between each pair of adjacent leaching chambers juice and slices are completely separated one from the other so that the slices are effectually prevented from remaining always in contact with the same stratum of juice.

The inversion chambers can be constituted with especial advantage by walls assembled to form an inverted V, one of them being perforated at its upper part and the other at its lower part. With this construction it is impossible for the slices that are thrown over the inversion chambers by the ejection devices, to remain at rest but they are obliged to roll over the roof-shaped oblique walls of the inversion chamber unimpeded down into the next chamber.

An embodiment of the invention is diagrammatically illustrated by way of example in the accompanying drawing, in which:—

Figure 1 is a longitudinal section. Fig. 2 is a section on the line A—B in Fig. 1, through the trough alone.

The diffusion or leaching apparatus consists of the semi-circular inclined trough $a$ which is subdivided into a number of leaching chambers $d$ and inversion chambers $e$ by partitions $b$ and $c$ which leave a portion of its cross section free. The partitions $b$ and $c$ are assembled to form an inverted V and terminate below the driving shaft $f$ which passes through the entire length of the trough. The walls $b$ are perforated at their lower end at $g$ and the walls $c$ at their upper end at $h$.

The feed chute $i$ is provided for supplying the slices; the slices as they fall are carried upward by the conveyer arms $k$ which are fixed with an appropriate degree of inclination upon the shaft $f$ (for the sake of clearness only on the ends of the trough these arms are shown in Fig. 1) into the several chambers $d$ and by means of the ejection devices $l$ which are made considerably wider than the agitator arms $k$, and which are also represented at the ends of the trough only, they are thrown over the summit of the walls $b$, $c$, assembled V-fashion, into the next chamber $d$. The liquid serving for the leaching flows in counter current to the slices which is usually water or juice supplied through the pipe $m$. This juice flows in the direction indicated by the arrow in the right hand half of Fig. 1 through the holes $h$ in the walls $c$ from above into the inversion chambers $e$ while at the lower end of these chambers it flows out through the perforations $g$ in the walls $b$ into the next lower chamber and so forth, and, as indicated by the straight arrow shown in the penultimate chamber $d$, it does not pass through the mass of slices accumulated in the chamber merely in the longitudinal direction of the trough but also in the diagonal direction from below upward and inside the inversion chambers $e$ it is completely separated from the slices thrown over these chambers. The leached slices are conveyed from the last chamber $d$ at the right hand end of the trough by a conveyer device in the form of a worm $n$ or the like into the pipe $o$ from which they can be removed by some other convenient conveyer mechanism. The juice extracted flows through the pipe $p$ for further treatment. The juice flowing from the extreme right hand chamber $d$ is carried through the pipe $q$ in the direction indicated by the arrow back into the leaching apparatus by the pipe $m$.

Obviously instead of assembling the partitions $b$ and $c$ V-fashion they might form U-shaped members; a plurality of the novel apparatus might also be arranged in series.

What I claim and desire to secure by Letters Patent of the United States is:—

1. A chamber apparatus for leaching sacchariferous vegetable slices by counter-current, comprising an inclined trough with an inlet for the slices at one end and with an inlet for the liquid at the other end the outlets for slices and liquid being also at opposite ends of the trough, the latter being divided by partitions into several chambers, agitating and conveying means in the chambers adapted to throw the slices over the several partitions and separate overfalls being provided for the passage of the liquid from one chamber to the next.

2. A chamber apparatus for leaching sacchariferous vegetable slices by counter-current, comprising an inclined trough with an inlet for the slices at one end and with an inlet for the liquid at the other end the outlets for slices and liquid being also at opposite ends of the trough, the latter being divided by partitions into several chambers, agitating and conveying means in the chambers adapted to throw the slices over the several partitions and separate overfalls being provided for the passage of the liquid from one chamber to the next, said overfalls comprising hollow partitions forming chambers, said chambers having inlet openings for the liquid of the higher chamber at the upper end of one wall and having outlet openings communicating with the lower chamber formed in the lower end of the other wall.

3. A chamber apparatus for leaching sacchariferous vegetable slices by counter-current, comprising an inclined trough with an inlet for the slices at one end and with an inlet for the liquid at the other end the outlets for slices and liquid being also at opposite ends of the trough, the latter being divided by partitions into several chambers, agitating and conveying means in the chambers adapted to throw the slices over the several partitions and separate overfalls being provided for the passage of the liquid from one chamber to the next, said overfalls comprising hollow partitions forming chambers, said chambers having inlet openings for the liquid of the higher chamber at the upper end of one wall and having outlet openings communicating with the lower chamber formed in the lower end of the other wall, said walls forming a chamber in the form of an inverted V.

In testimony whereof I affix my signature in presence of two witnesses.

MAX PASCHEN.

Witnesses:
MILLI BALLERSTEIN,
FRITZ TOMKE.